United States Patent
Teather et al.

(10) Patent No.: US 8,361,611 B2
(45) Date of Patent: Jan. 29, 2013

(54) DIFFUSIVELY LIGHT REFLECTIVE PAINT COMPOSITION, METHOD FOR MAKING PAINT COMPOSITION, AND DIFFUSIVELY LIGHT REFLECTIVE ARTICLES

(75) Inventors: Eric Teather, Elkton, MD (US); Xiaorong You, Shrewsbury, MA (US)

(73) Assignee: WhiteOptics LLC, New Castle, DE (US)

( * ) Notice: Subject to any disclaimer, the term of this patent is extended or adjusted under 35 U.S.C. 154(b) by 94 days.

(21) Appl. No.: 12/887,205

(22) Filed: Sep. 21, 2010

(65) Prior Publication Data

US 2011/0064939 A1    Mar. 17, 2011

Related U.S. Application Data

(63) Continuation-in-part of application No. 12/728,160, filed on Mar. 19, 2010.

(60) Provisional application No. 61/210,660, filed on Mar. 20, 2009.

(51) Int. Cl.
B32B 3/26 (2006.01)

(52) U.S. Cl. ............... 428/316.6; 428/304.4; 428/317.7; 524/500; 521/50; 106/409

(58) Field of Classification Search ................. 524/500, 524/501; 428/316.6, 304.4, 317.7; 521/50; 106/409
See application file for complete search history.

(56) References Cited

U.S. PATENT DOCUMENTS

| | | | |
|---|---|---|---|
| 3,887,800 A | 6/1975 | Johnson | |
| 4,007,141 A | 2/1977 | Wismer et al. | |
| 4,023,903 A | 5/1977 | Scheib | |
| 4,190,321 A | 2/1980 | Dorer et al. | |
| 4,191,672 A * | 3/1980 | Salome et al. | 523/501 |
| 4,427,836 A * | 1/1984 | Kowalski et al. | 525/301 |
| 4,575,278 A | 3/1986 | Whitney | |
| 4,882,372 A * | 11/1989 | Woo et al. | 523/411 |
| 4,885,663 A | 12/1989 | Parker | |
| 4,935,079 A | 6/1990 | Nelson-Ashley et al. | |
| 4,945,008 A | 7/1990 | Heyes et al. | |
| 4,957,820 A | 9/1990 | Heyes et al. | |
| 4,975,138 A | 12/1990 | Finlayson | |
| 5,059,460 A | 10/1991 | Heyes et al. | |
| 5,234,516 A | 8/1993 | Okamura et al. | |
| 5,440,197 A | 8/1995 | Gleckman | |
| 5,510,422 A * | 4/1996 | Blankenship et al. | 525/301 |
| 5,596,450 A | 1/1997 | Hannon et al. | |

(Continued)

FOREIGN PATENT DOCUMENTS

| EP | 1025390 B1 | 10/2002 |
|---|---|---|
| EP | 1724621 A1 | 11/2006 |

(Continued)

OTHER PUBLICATIONS

Labsphere's manual entitled "A guide to Reflectance Coatings and Materials", downloaded on May 21, 2012.*

(Continued)

*Primary Examiner* — Vu A Nguyen
(74) *Attorney, Agent, or Firm* — Wombie Carlyle Sandridge & Rice LLP

(57) ABSTRACT

A diffusively reflective paint composition is disclosed for use in reflectors in lighting fixtures. The paint is formed by blending macroporous polymeric particles with a paint carrier. The macroporous polymeric particles are formed by reducing a reflective macroporous sheet material. The paint can further comprise solid or hollow microspheres. The paint can be applied to a variety of substrates to form diffusely reflective articles.

24 Claims, 3 Drawing Sheets

U.S. PATENT DOCUMENTS

| | | | |
|---|---|---|---|
| 5,627,426 A | 5/1997 | Whitman et al. | |
| 5,672,409 A | 9/1997 | Miyakawa et al. | |
| 5,800,909 A | 9/1998 | Nitta et al. | |
| 5,976,686 A | 11/1999 | Kaytor et al. | |
| 6,015,610 A | 1/2000 | Minor et al. | |
| 6,123,442 A | 9/2000 | Freier et al. | |
| 6,189,934 B1 | 2/2001 | Scruggs | |
| 6,235,105 B1 | 5/2001 | Hubbard et al. | |
| 6,272,265 B1 | 8/2001 | Franklin | |
| 6,282,821 B1 | 9/2001 | Freier et al. | |
| 6,301,770 B1 | 10/2001 | McIlwraith | |
| 6,451,874 B1 * | 9/2002 | Purgett et al. | 523/172 |
| 6,464,367 B2 | 10/2002 | Ito et al. | |
| 6,497,946 B1 | 12/2002 | Kretman et al. | |
| 6,607,794 B1 | 8/2003 | Wilson et al. | |
| 6,617,019 B2 | 9/2003 | Danner et al. | |
| 6,641,880 B1 | 11/2003 | Deyak et al. | |
| 6,671,452 B2 | 12/2003 | Winston et al. | |
| 6,780,355 B2 | 8/2004 | Kretman et al. | |
| 6,974,498 B2 | 12/2005 | Brown | |
| 7,416,774 B2 | 8/2008 | Ueda et al. | |
| 7,441,916 B2 | 10/2008 | Masuyama et al. | |
| 2001/0010630 A1 | 8/2001 | Umemoto | |
| 2002/0007576 A1 | 1/2002 | Gai | |
| 2003/0067759 A1 | 4/2003 | Blanchard | |
| 2003/0095332 A1 | 5/2003 | Gardner et al. | |
| 2003/0118805 A1 | 6/2003 | Kretman et al. | |
| 2003/0134086 A1 | 7/2003 | Nun et al. | |
| 2004/0004827 A1 | 1/2004 | Guest | |
| 2004/0005451 A1 | 1/2004 | Kretman et al. | |
| 2004/0047162 A1 | 3/2004 | Saccomanno et al. | |
| 2004/0071937 A1 | 4/2004 | Chien et al. | |
| 2004/0080938 A1 | 4/2004 | Holman et al. | |
| 2004/0104663 A1 | 6/2004 | Umeya et al. | |
| 2004/0119400 A1 | 6/2004 | Takahashi et al. | |
| 2005/0106333 A1 | 5/2005 | Lehmann et al. | |
| 2005/0116607 A1 | 6/2005 | Park et al. | |
| 2005/0140258 A1 | 6/2005 | Leu et al. | |
| 2005/0154109 A1 | 7/2005 | Li et al. | |
| 2005/0221121 A1 | 10/2005 | Ishihara et al. | |
| 2006/0008638 A1 | 1/2006 | Kiehne et al. | |
| 2006/0008641 A1 | 1/2006 | Kiehne et al. | |
| 2006/0067079 A1 | 3/2006 | Noh et al. | |
| 2006/0087863 A1 | 4/2006 | Choi et al. | |
| 2006/0109685 A1 | 5/2006 | Noh et al. | |
| 2006/0216477 A1 | 9/2006 | Peng et al. | |
| 2006/0262310 A1 | 11/2006 | Starry et al. | |
| 2007/0230191 A1 | 10/2007 | Komuro et al. | |
| 2007/0251422 A1 | 11/2007 | Maenaka et al. | |
| 2007/0263411 A1 | 11/2007 | Schellhorn et al. | |
| 2008/0047748 A1 | 2/2008 | Currie et al. | |
| 2008/0080055 A1 | 4/2008 | Lightfoot et al. | |
| 2008/0113183 A1 | 5/2008 | Kitai et al. | |
| 2008/0206458 A1 | 8/2008 | Watanabe et al. | |
| 2008/0225512 A1 | 9/2008 | Roberts et al. | |
| 2008/0291696 A1 | 11/2008 | Kim et al. | |
| 2008/0299875 A1 | 12/2008 | Duescher | |
| 2008/0305365 A1 | 12/2008 | Yamazaki et al. | |

FOREIGN PATENT DOCUMENTS

| | | |
|---|---|---|
| FR | 2869041 A1 | 10/2005 |
| JP | 2004-151707 A | 5/2004 |
| JP | 2006-323392 A | 11/2006 |
| JP | 2007-213079 | 8/2007 |
| WO | WO-99/21913 A1 | 5/1999 |
| WO | WO 0015351 A1 | 3/2000 |
| WO | WO-01/09227 A1 | 2/2001 |
| WO | WO-2004/017700 A1 | 2/2004 |
| WO | WO 2007028961 A2 | 3/2007 |

OTHER PUBLICATIONS

Gichaba, Justus Ogwoka, "Measurements of TYVEK Reflective Properties for the Pierre Auger Project", Aug. 1998, Unpublished thesis, The University of Mississippi.

Levinson, Ronnen, "Cool Colors for Summer: Characterizing the Radiative Properties of Pigments for Cool Roofs", EETD Noon Seminar (presentation), Apr. 22, 2004.

Arteaga Velázquez, J.C. et al., "Device for diffused reflectivity measurement of samples immersed in water", *Superficies y Vacío*, Dec. 2000, pp. 50-52, vol. 11, Sociedad Mexicana de Ciencia de Superficies y de Vacío.

PCT/US2010/028063 International Search Report.
PCT/US2010/028063 Written Opinion.
EP 11250815.5 Search Report.

* cited by examiner

DIFFUSIVELY LIGHT REFLECTIVE PAINT COMPOSITION, METHOD FOR MAKING PAINT COMPOSITION, AND DIFFUSIVELY LIGHT REFLECTIVE ARTICLES

This application is a Continuation-in-Part of application Ser. No. 12/728,160 filed Mar. 19, 2010, which claims benefit to Provisional Application No. 61/210,660 filed Mar. 20, 2009, the disclosures of which are herein incorporated by reference in their entirety.

BACKGROUND OF THE INVENTION

1. Field of the Invention

The invention relates to a light reflective paint composition for use in light reflective articles in which diffuse light reflectance is desired. The invention further relates to a method for making the paint composition and to light reflective articles made using the paint composition.

2. Description of Related Art

Reflectors are used in numerous types of lighting fixtures to maximize the usable light, thus increasing the lighting efficiency. Maximization is achieved through a combination of reflecting and redirecting light generated by the lamp in a desired direction, and minimizing the light absorbed by the reflector. This is particularly important when the light fixture design includes a light cavity in which light rays are redirected multiple times within the cavity before exiting the light fixture as usable light. Lamps that use reflectors include tubular fluorescent lamps and light emitting diodes (LED).

Tubular fluorescent lamps emit light in 360 degrees around the lamp, thus the reflector redirects light from the back of the lighting fixture as usable light. LED light fixtures use a reflector in order to mix, obscure, or diffuse the discrete image(s) of individual LED lamps while maximizing useable lumens per given wattage. This reflector often consists of painted metal or highly polished aluminum. It is desirable to maximize the light reflected by the reflector and minimize the light absorbed by the reflector, as any light absorbed is unusable thereby decreasing the efficiency of the fixture.

Diffuse reflectance occurs when incident light is reflected by a surface such that the reflected light is scattered randomly or in a Lambertian fashion. By contrast, specular reflectance occurs when incident light is reflected at the same angle as the incident angle. Specular reflectors have been used in light fixtures to both direct light out of the fixture in a controlled or focused distribution and increase overall fixture efficiency. Diffuse reflectance is preferred in situations in which low glare is desired and/or in which it is desired to distribute light evenly over as broad an area as possible. White, diffuse reflectors are often used in room and office lighting to reduce specular glare.

The reflector surface includes metal components fabricated from coil steel or aluminum. Coil steel or aluminum is coated in continuous coil equipment with a paint typically containing titanium dioxide light scattering particles, and the coating is subsequently cured. The resulting coil surface has reflectance of up to about 90% and can be metal-formed into reflectors or light fixture bodies. Alternatively, powder coat paint is applied to light fixtures post metal-forming to provide a surface reflectance of up to 94%.

Lighting fixtures (e.g., luminaires, signage, daylighting applications, etc.) often have complex shapes including hemispherical domes and flanged edges, making it difficult to incorporate known reflective sheet. A reflective sheet can be laminated to steel and then formed into various geometries; however, this lamination step is not possible in all coil coating systems and requires an expensive adhesive to ensure proper lamination.

SUMMARY OF THE INVENTION

It would be desirable to have a simple, economical means of providing a diffusively reflective surface for use in lighting fixtures which would avoid the problems inherent in known reflectors.

In one aspect, a diffusively light reflective paint composition is disclosed, which comprises a paint carrier and between about 1% by weight and about 90% by weight macroporous polymeric particles having an average diameter between about 1 micron and about 300 microns. The macroporous particles can be polymeric macroporous particles derived from a polymeric macroporous sheet material having pores or voids. Plastic or ceramic microspheres can be combined with the macroporous particles.

In another aspect, a diffusively light reflective article is disclosed, which comprises a substrate having at least one light reflective surface having a layer thereon of diffusively light reflective paint comprising a paint carrier and between about 1% by weight and about 90% by weight macroporous polymeric particles having an average diameter between about 1 micron and about 300 microns. The macroporous particles can be polymeric macroporous particles derived from a polymeric macroporous sheet material having pores or voids. Plastic or ceramic microspheres can be combined with the macroporous particles in the paint carrier.

In a further aspect, a process is disclosed for making a diffusively light reflective paint composition comprising:
  a) providing a paint carrier,
  b) adding between about 1% by weight and about 90% by weight macroporous polymeric particles having an average diameter between about 1 micron and about 300 microns to said paint carrier, and
  c) blending said paint carrier and said macroporous polymeric particles to form a slurry. The macroporous polymeric particles can be combined in conjunction with plastic or ceramic microspheres. The microspheres are added to the paint carrier.

In yet another aspect, a method is disclosed for forming a diffusively light reflective article comprising:
  a) providing a substrate comprising at least one surface,
  b) applying a diffusively light reflective paint to at least one surface of the substrate, and
  c) optionally, embossing a dry powder of plastic or ceramic microspheres, or both, on the substrate and curing the substrate.

In yet even a further aspect, a method is disclosed for forming a diffusively light reflective article comprising:
  a) filling a mold cavity with the paint composition disclosed above,
  b) thermally curing the paint composition while contained in the mold, and
  c) releasing the cured material from the mold to form a discrete reflective part.

DEFINITIONS

Figure 1:
FIG. 1 is a graph of percentage reflectance versus wavelength for Example 1 and Example 2 of the disclosed diffusively light reflective paint composition compared with known comparative materials.
Figure 2:
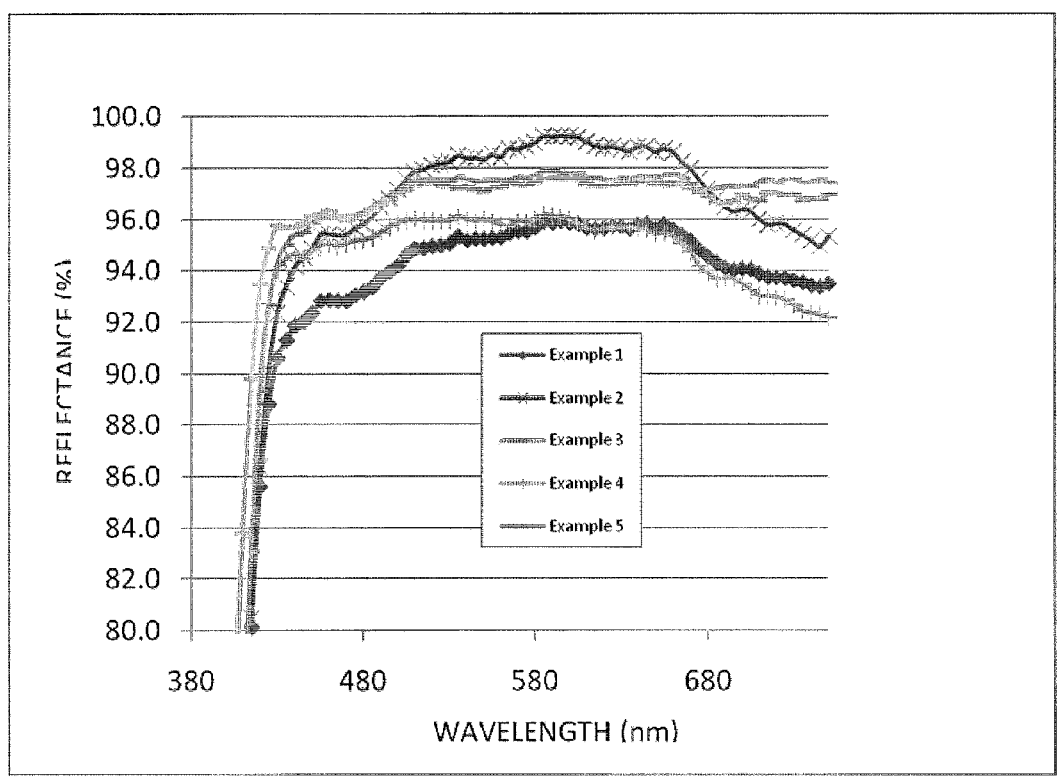
FIG. 2 is a graph of percentage reflectance verses wavelength for Examples 1-5 of the disclosed diffusively light reflective paint composition.
Figure 3:
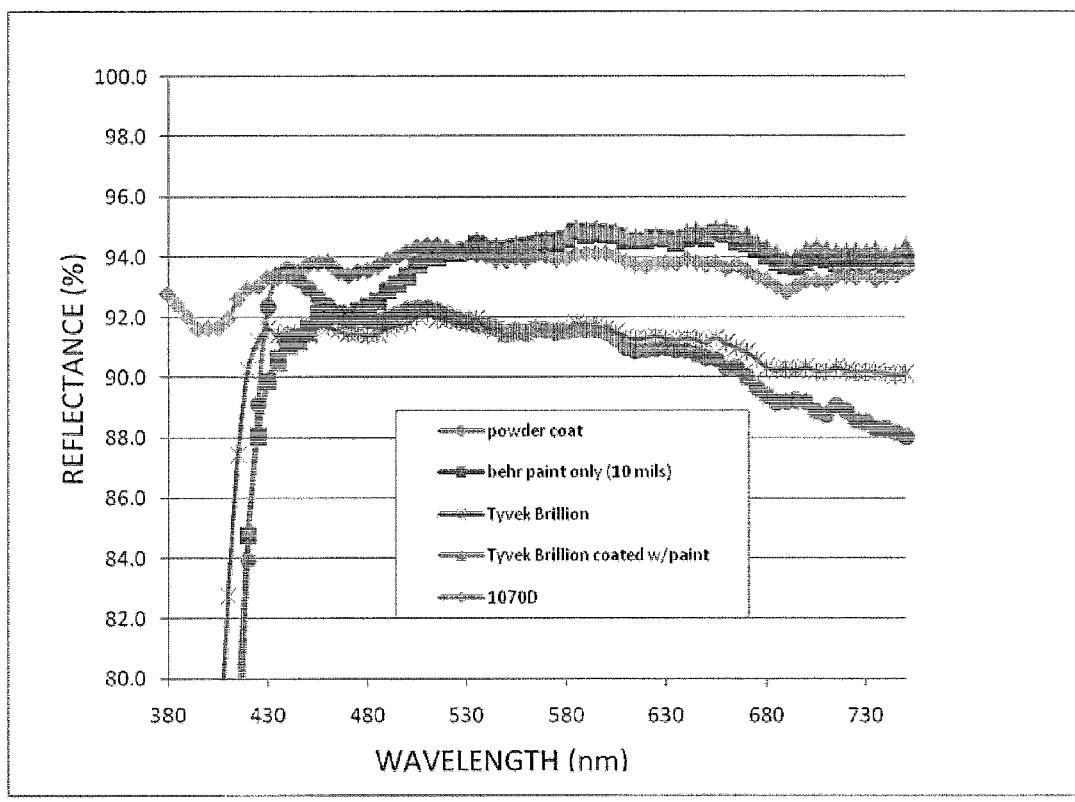
FIG. 3 is a graph of percentage reflectance verses wavelength of several known materials.

While mostly familiar to those versed in the art, the following definitions are provided in the interest of clarity.

Macroporous materials: Materials that have pore diameters greater than 50 nanometers.

Microsphere material: Plastic or ceramic, hollow or solid spheres with diameters ranging from 1 to 20 microns.

DETAILED DESCRIPTION OF THE INVENTION

A diffusely reflective paint composition is disclosed, which comprises paint carrier and between about 1% by weight and about 90% by weight macroporous polymeric particles having an average diameter between about 1 micron and about 300 microns.

The paint system can be organic solvent-based, water-based polymer emulsion or 100% resin solution. The paint system can further be comprised of a polymer binder such as an acrylic binder, polyurethane binder, polyester binder, latex-binder, alkyd-binder, epoxy-based binder, or a mixture thereof. The polymer binder can also be a hybrid epoxy/acrylate binder. The paint system and the particles are blended to form a paint-particle slurry.

The reflective macroporous particles are polymeric macroporous particles derived from a polymeric macroporous sheet material having pores or voids which are less than about 600 nm in diameter, including less than 500 nm, less than 400 nm, and less than 300 nm. Further, the macroporous sheet material can have pores or voids in the range from about 100 nm to less than about 600 nm in diameter, including from about 200 nm to less than about 600 nm in diameter, from about 200 nm to about 500 nm in diameter, and from about 300 nm to about 400 nm in diameter. Pore size for effective scattering of visible light range from 100 nm to 1000 nm, including 500 nm. Such sheet materials are white polymeric fibrous nonwoven sheets or macroporous films having high light reflectance. The sheet materials can also be referred to as microvoid or microcellular reflective sheets. The fiber can be inter-dispersed with inorganic particles such as titanium dioxide or barium sulfate to further improve the light reflectance.

One such macroporous sheet material is a reflective microcellular foamed polymer sheet, for example white 98% reflective microcellular foamed polyester sheet available as MC-PET from Furukawa Electric Co. Ltd. (Tokyo, Japan). The microcellular foamed sheet is formed by overlapping a thermoplastic polyester sheet and a separator fabric on each other and rolling them, impregnating an inert gas into the thermoplastic polyester sheet while the roll is kept in a pressurized inert gas atmosphere, and foaming the thermoplastic polyester sheet by heating it under atmospheric pressure. The method for forming the foamed sheet is generally disclosed in U.S. Pat. No. 5,723,510, which is herein incorporated by reference in its entirety.

Another macroporous sheet material is a reflective nonwoven sheet, for example a plexifilamentary film-fibril sheet made from flash spun polymer. One such sheet is formed from high-density polyethylene and is available as DuPont™ Tyvek® from E.I. du Pont de Nemours & Co. (Wilmington, Del.). The starting material for the sheet is a lightly consolidated flash-spun polyethylene plexifilamentary film-fibril sheet produced by the general procedure of Steuber, U.S. Pat. No. 3,169,899, hereby incorporated by reference in its entirety. A high-density polyethylene is flash spun from a solution of the polyethylene in a solvent. The solution is continuously pumped to spinneret assemblies. The solution is passed in each spinneret assembly through a first orifice to a pressure let-down zone and then through a second orifice into the surrounding atmosphere. The resulting film-fibril strand is spread and oscillated by means of a shaped rotating baffle, is electrostatically charged, and then is deposited on a moving belt. The spinnerets are spaced to provide overlapping, intersecting deposits on the belt to form a wide batt which is then lightly consolidated. The term "plexifilamentary" as used herein, refers to a strand which is characterized as a three-dimensional integral network of a multitude of thin, ribbon-like, film-fibril elements of random length and of less than about 4 microns average thickness, generally coextensively aligned with the longitudinal axis of the strand. The film-fibril elements intermittently unite and separate at irregular intervals in various places throughout the length, width and thickness of the strand to form the three-dimensional network. Such strands are described in further detail by Blades and White, U.S. Pat. No. 3,081,519 and by Anderson and Romano, U.S. Pat. No. 3,227,794, both hereby incorporated by reference.

A further macroporous sheet material is a biaxially stretched film such as a polyester filled film such as those disclosed in U.S. Pat. No. 4,654,249, hereby incorporated by reference. Another suitable macroporous sheet material is a membrane formed by a thermally induced phase separation process, such as those membranes disclosed in U.S. Pat. Nos. 6,790,404, 6,780,355, 6,632,850, and U.S. Patent Application Nos. 2003/0036577 and 2005/0058821, all hereby incorporated by reference. Suitable macroporous sheet materials also include expanded membranes such as ePTFE such as those membranes disclosed in U.S. Pat. Nos. 6,015,610, 5,982,542, 5,905,594, 5,892,621, and 5,596,450, all hereby incorporated by reference.

The macroporous particles are formed from the macroporous sheet material by any process suitable to reduce the size of the sheet material to suitably sized particles, including less than about 300 microns in diameter. Such processes include grinding using a device such as a rotary knife mill, two-roll mill, granulator, turbo mill and the like, and combinations thereof. Depending on the material used and the devices available, the macroporous sheet material is coarsely ground or shredded initially using coarse grinding means, and subsequently reduced more finely using a fine grinding means.

One process for reducing the size of a macroporous sheet material is disclosed in U.S. Pat. No. 4,965,129, herein incorporated by reference. This process includes slitting a lightly consolidated plexifilamentary film-fibril sheet made from flash spun high density polyethylene into strips and subsequently cutting the strips into short lengths by means of a rotating knife cutter. The short lengths are chopped into smaller pieces in a granulator. As a nonlimiting example, a Sprout-Bauer DSF-1518 granulator can be employed. The chopped pieces can then be passed through a screen having 0.48 by 0.48-cm openings, and further reduced in size in a turbo-mill. A nonlimiting example of a turbo-mill is a Model 3A Ultra-Rotor mill (distributed by Industrial Process Equipment Co. of Pennsauken, N.J.) having blades 71 cm in diameter. A wetting agent can be added to the turbo-mill to provide a 2% concentration of the agent based on the weight of the plexifilamentary film-fibril sheet. As disclosed in U.S. Pat.

No. 4,965,129, a fibrous polyethylene particle pulp resulting from this process exhibited a drainage factor of 0.12, a Bauer-McNett classification value of 53% on a 14 mesh screen, and a surface area of 1.7 m$^2$/g. Drainage factor was determined in accordance with a modified TAPPI T221 OS-63 test, as disclosed in U.S. Pat. No. 3,920,507. Classification value was determined in accordance with TAPPI T33 OS-75. TAPPI refers to the Technical Association of Paper and Pulp Industry. Surface area was measured by the BET nitrogen absorption method of S. Brunauer, P. H. Emmett and E. Teller, J. Am. Chem. Soc., V. 60, 309-319 (1938), herein incorporated by reference. The above described process disclosed in U.S. Pat. No. 4,965,129 can also be applied to other macroporous sheet materials suitable for use in the invention, including reflective microcellular foamed sheet, to reduce the material into suitably sized particles.

Another way to create macroporous particles is to take the coarse chips of the macroporous sheet material made through rotary knife milling and process them in a rotating hammer mill. Mills such as the Hosokawa Mikro Pulverizer can be continuously fed with chips of plexifilimentary fiber sheet or microvoided PET sheet. The particles are reduced in size through the mechanical action of the rotating hammers over a serrated liner and small diameter screen. The particles can be coated while being milled to improve particle properties. Liquid water, surfactant, dispersants, wetting agents and/or pigments can be added to the milling chamber in a metered flow to reduce milling temperature, improve throughput and/or coat the particles for additional properties. Particle coatings can be used to improve dispersion in solution, maintain reflectance through the milling process, improve milling throughput or affect the optical properties of the resultant particles.

The size of the macroporous particles allows for good dispersion in the paint. Particles which can be dispersed are generally no greater than about 300 microns in average diameter. The average diameter of the particles is greater than the size of the reflective voids within the macroporous material, i.e., greater than about 600 nm. Particles for use in the paint-particle slurry can be at least about 1 micron in average diameter, including from about 2 microns to about 300 microns, from about 10 microns to about 300 microns, from about 10 microns to about 200 microns, from about 50 microns to about 300 microns, from about 100 microns to about 300, and from about 100 microns to about 200 microns in diameter. The particles can also have an average particle size of about 10 microns. Macroporous particles foamed from plexifilimentary fibers may have fiber diameters from about 5 microns to about 10 microns, with fiber lengths from 10 microns to as long as 200 microns, including 50 microns and 100 microns.

Microspheres may be combined with macroporous particles to improve reflectance and/or reduce the amount of required macroporous particles. The microspheres may also act as a viscosity modifier, lowering the viscosity of the paint carrier and polymer binder system. Microsphere material can comprise numerous plastic or ceramic, hollow or solid microspheres packed together, such as expancel microspheres Luxsil and Extendospheres XOL-150. These particles function as separate spheres or cells. The cells are closed, can be filled with gas or air, and create voids between other particles ground from macroporous sheet materials or pigments to increase reflectance of paint materials. In addition, these microspheres offer elasticity, compressibility, cost reduction, low density, and surface modification. Sizes of the microspheres range from about 1 micron to about 20 microns in diameter, including about 5 microns, 10 microns, and 15 microns. Reflectance of a 1 cm thick packed layer of various microsphere's and common particles were found to be:

| Powder | Manufacturer | average reflectance (Y) |
|---|---|---|
| Dynoadd 506 (PMMA Spheres) | Dynea | 97.5 |
| Dynoadd 510 (PMMA sphere) | Dynea | 97.1 |
| Dynoadd 515 (PMMA sphere) | Dynea | 96.7 |
| TiO2 (R104) (pigment) | DuPont | 95.4 |
| Expancel d70 (hollow sphere) | AkzoNobel | 94.3 |
| TiO2 (R902) (pigment) | DuPont | 93.3 |
| Expancel d60 (hollow sphere) | AkzoNobel | 92.2 |
| aeroxide alu C (hydrophilic Al oxide) | Evonik | 92.0 |
| Luxsil (hollow sphere) | Potters Industries | 91.1 |
| Wacker HDK N20 (hydophilic silica) | Wacker | 86.2 |
| Cabot (silica) nanogel | Cabot | 80.6 |
| Cabot M5 (silica) | Cabot | 78.3 |

Both hollow and solid microspheres may be used together with the macroporous particles. When used together, the volume ratio of hollow to solid microspheres can range from about 1:4 to about 3:4, including 2:4. The microspheres are present between about 0.5% to about 10% by weight, including about 1%, 3%, 5%, 7%, and 9% by weight. Although these microsphere materials can have high reflectance when measured in dry powder form, this reflectance is lost when combined with similar index-of-refraction binder material in a coating dispersion.

The paint-particle slurry can be further processed to reduce agglomeration of the particles in the paint carrier. High sheer mixing, microfluidizing, and ultra-sonic mixing are some of the techniques that can reduce agglomeration. High sheer mixing can be performed using a rotor-stator mixer such as a Silverson Homogenizer. Microfluidizing can be performed using a microfluidizer from Microfluidics. Ultra-sonic mixing can be performed in an ultrasonic mixture from Hielscher Ultrasonics GmbH. The further processing reduces the particle size in the paint-slurry to as low as 1 micron, including between about 10 microns to 1 micron, between about 10 microns to about 5 microns, and between about 5 microns to 1 micron. Additionally, the particle size of the further processed paint-particle slurry is stable for about 5 days to about 60 days, including 5 days to about 50 days, 5 days to about 40 days, 5 days to about 30 days, 5 days to about 20 days, 5 days to about 10 days, 10 days to about 30 days, 10 days to about 20 days, and 15 days. Stable means the particle size does not change more than ±10% over the duration.

The paint-particle slurry contains a concentration of reflective particles that results in a high level of light reflectance while allowing the slurry to flow freely. Any concentration of particles meeting these requirements is suitable. A preferable range of concentration of particles in the slurry is between about 1% and about 90% by weight, including between about 20% and about 80% by weight, between about 20% and about 60% by weight, between about 20% and about 50% by weight, between about 30% and about 50% by weight, between about 5% and about 20% by weight, and between about 5% and 10% by weight.

Once the applied slurry is dried, the thickness of the layer of dried paint is between about 0.025 mm and about 1 mm, including from about 0.090 mm to about 0.250 mm, from about 0.090 mm to about 180 mm, and from about 0.090 mm to about 0.150 mm. The dried layer of paint has a light reflectance of at least about 94% across the visible spectrum, including about 95%, 96%, 97%, and 98% across the visible spectrum.

The slurry can optionally include additives known for use in paint compositions, such as UV protective additives, pigments, wetting agents, dispersants, antistatic agents, UV inhibitors, optical brighteners (including wave-length shifting or fluorescing agents), wax lubricants, antioxidants, antimicrobial agents and mixtures thereof. Further, coloring agents can be including in the paint composition to impart the reflective articles with nonwhite color or hue.

Optionally, one can emboss high reflectance dry powders on the partial cured slurry surface to improve the paint reflectance. The slurry then can be fully cured. One option to achieve the embossing is to partially cure the substrate with thermal or UV curing or combined thermal/UV curing, followed by spraying high reflectance dry powder and embossing via embossing roll, then fully curing the substrate by means of thermal or UV curing or combined thermal/UV curing. The high reflectance dry powders can comprise crosslinked polymeric particles, plastic microspheres, ceramic microspheres, and/or $TiO_2$.

A diffusively light reflective article is formed by applying the slurry to any substrate for use in lighting fixtures such as luminaires, signage, and daylighting applications. Suitable substrates include but are not limited to flexible planar substrates, rigid substrates such as lighting fixture housings, coil steel or aluminum substrate, low-cost semi-flexible polyester sheet and similar materials.

The slurry can be applied to the substrate using any painting method including, but not limited to, spraying, rolling, dipping, brushing, extruding and similar methods as would be apparent to one skilled in the art. The slurry can advantageously be coated onto any reflector surface regardless of geometry. For instance, the slurry can be sprayed into a lighting fixture cavity such as a dome or hemisphere to create a diffusively light reflective reflector.

The slurry can be applied to any substrate including coil steel or aluminum using any known painting method. The slurry on the painted substrate can be cured using known means including oven curing, convection curing, and UV curing. The cured, painted coil steel or aluminum can then be formed according to known processing including bending, stamping, roll-forming the coil steel or aluminum to the desired shape. Unlike known coatings, such processing will not damage the slurry coatings disclosed herein The slurry can also be applied into a mold and cured with heat or other known means to effectively make discrete, molded parts. Additional materials, such as binders, plasticizers, and thickeners can be added to the slurry prior to forming a molded part, to help with the molding process. Such parts can be used as reflector trims or reflector inserts for ease of assembly in light fixtures or other optical systems.

It will be readily apparent to one of ordinary skill in the relevant arts that other suitable modifications and adaptations to the methods and applications described herein are obvious and may be made without departing from the scope of the invention or any embodiment thereof. Having now described the present invention in detail, the same will be more clearly understood by reference to the following examples, which are included herewith for purposes of illustration only and are not intended to be limiting of the invention.

EXAMPLES

The examples below describe several methods for making several aspects of the diffusively light reflective paint composition and diffusively light reflecting articles made with the paint composition.

Example 1

Plexifilamentary film-fibril sheet material sold as DuPont™ Tyvek® Brillion grade 4173DR (available from E.I. du Pont de Nemours & Co., Wilmington, Del.) was ground into fine particles having an average diameter of approximately 200 microns using a rotor mill. Polyethylene glycol was used as a wetting agent to prevent particle agglomeration. The particles were combined with white paint sold as Behr® Ultrawhite Premium Plus® (available from Behr Process Corp., Santa Ana, Calif.) and mixed using a high-shear mixer to create a paint-particle slurry containing about 20% particles and about 80% paint by weight. The slurry was then applied to a rigid piece of pre-painted aluminum sheet. The coating was dried in an oven at approximately 80° C. The dry weight of the coating was approximately 60 grams per square meter. The thickness of the dry coating was approximately 90 microns. The reflectance of the aluminum sheet coated with the paint alone, the aluminum sheet coated with the paint-particle slurry, the plexifilamentary film-fibril sheet material coated with the paint alone, and the plexifilamentary film-fibril sheet material alone were measured and are compared in FIG. 1.

Example 2

Plexifilamentary film-fibril sheet material sold as DuPont™ Tyvek® Brillion grade 4173DR was combined with titanium dioxide ($TiO_2$) in the form of 70%/30% $TiO_2$/low density polyethylene masterbatch pellets sold as Ampacet White 110607 (supplied by Ampacet Corp., Tarrytown N.Y.) and ground into fine particles having an average diameter of approximately 100 microns using a rotor mill. The particles were combined with Glidden® acrylic-based white paint to create a paint-particle slurry containing about 30% particles and about 70% paint by weight. The slurry was then applied to a rigid piece of pre-painted aluminum sheet. The coating was dried in an oven at approximately 80° C. The reflectance of the aluminum sheet coated with the paint-particle slurry was measured and the results are shown in FIG. 1.

Example 3

Plexifilamentary film-fibril sheet material sold as DuPont™ Tyvek® 1070D grade was ground into fine particles and combined at 8% weight with 82% water based acrylic adhesive (Royal Adhesive Bond Plus 20489), 4% crosslinking agent (Royal Adhesive #20490) 1% silicone surfactant (Silwet L-7608) and 5% TiO2 (DuPont R104). The slurry was coated on a piece of pre-painted aluminum sheet and cured at 80° C. to give a dry thickness of 250 microns.

Example 4

High reflectance biaxially oriented polyester film sold as Toray® E60SL was ground into fine particles having an average diameter of approximately 100 microns. The particles are combined with Behr® Ultrawhite Premium Plus® paint to create a paint-particle slurry containing about 12% particles and about 88% paint by weight. The slurry was coated on a rigid piece of pre-painted aluminum sheet and cured at 70° C. to give a dry thickness of 180 microns.

Example 5

Plexifilamentary film-fibril sheet material sold as DuPont™ Tyvek® 1070D grade was ground into fine particles using a Hosokawa Bantam Mikro-pulverizer. The particles were combined with a thermally curable acrylate binder system consisting of trimethylolpropane triacrylate (Sartomer SR351LV, 20%), propoxylated neopentyl glycol diacrylate (Sartomer SR-9003, 70%), Allyl Aliphatic Oligomer (Sartomer CN9101 8%) and cumene hydroperoxide (Luperox CU80, 2%). 15% particles and 5% TiO2 (DuPont R104) along with a dispersant (Silwet 7608, 1%) by weight were then added. The resultant slurry was coated on a rigid piece of pre-painted aluminum and cured at 80° C. to give a dry thickness of 150 microns.

Example 6

Thermally Curable Epoxy/Acrylate Hybrid Binder

Plexifilamentary film-fibril sheet material sold as DuPont™ Tyvek® 1070D grade was pre-treated with 2% wt BISC (3-methyldimethoxysilyl)propyl]-polypropylene-oxide (sold as Gelest SIB1660) and ground into fine particles using a Hosokawa Bantam Mikro-pulverizer before combining with a thermally curable epoxy/acrylate hybrid binder system consisting of trimethylolpropane triacrylate (Sartomer SR351LV, 18.6%), propoxylated neopentyl glycol diacrylate (Sartomer SR-9003, 14.5%), Allyl Aliphatic Oligomer (Sartomer CN9101 3%) and cumene hydroperoxide (Luperox CU80, 2%). Achiwell 4221 (Brenntag Specialties, Inc., 35.6%), OXT-101 (TOAGOSEI AMERICA INC., 16.3%), NACURE Super XC-7231, 50% propolylene carbonate solution (King Industries, 10%) 10% particles, 1% 461 DET 40 d25 and 10% $TiO_2$ (DuPont R104) along with a dispersant (BYK 340, 1.5%) by weight were then added. The slurry can be coated on a rigid piece of pre-painted aluminum sheet and cured at 100° C. to give a dry thickness of 150 microns. The reflectance of this aluminum coated sheet is expected to be between 97% and 98%.

Example 7

Thermally Curable Epoxy/Acrylate Hybrid Binder

Plexifilamentary film-fibril sheet material sold as DuPont™ Tyvek® 1070D grade was ground into fine particles and combined with a thermally curable epoxy binder system consisting of Achiwell 4221 (Brenntag Specialties, Inc., 57%), OXT-101 (TOAGOSEI AMERICA INC., 33%), NACURE Super XC-7231, 50% propolylene carbonate solution (King Industries, 10%) 10% particles, 1% Luxsil and 10% $TiO_2$ (DuPont R104) along with a dispersant (BYK 340, 1.5%) by weight were then added. The slurry can be coated on a rigid piece of pre-painted aluminum sheet and cured at 100° C. to give a dry thickness of 150 microns. The reflectance of this aluminum coated sheet is expected to be between 97% and 98%.

Example 8

Thermally Curable Epoxy Binder with Solvents

Plexifilamentary film-fibril sheet material sold as DuPont™ Tyvek® 1070D grade was ground into fine particles and combined with a thermally curable epoxy binder system consisting of Achiwell 4221 (Brenntag Specialties, Inc., 32.4%), OXT-101 (TOAGOSEI AMERICA INC., 18.8%), NACURE Super XC-7231, 50% propolylene carbonate solution (King Industries, 4.4%), isopropyl alcohol (22.2%), Dowanol (22.2%), 10% particles, 1% Luxsil and 10% $TiO_2$ (DuPont R104) along with a dispersant (BYK 340, 1.5%) by weight were then added. The slurry can be coated on a rigid piece of pre-painted aluminum sheet and cured at 100° C. to give a dry thickness of 150 microns. The reflectance of this aluminum coated sheet is expected to be between 97% and 98%.

Example 9

UV Curable Epoxy/Acrylate Hybrid Binder

Plexifilamentary film-fibril sheet material sold as DuPont™ Tyvek® 1070D grade was ground into fine particles and combined with a thermally curable epoxy/acrylate hybrid binder system consisting of trimethylolpropane triacrylate (Sartomer SR351LV, 18.6%), propoxylated neopentyl glycol diacrylate (Sartomer SR-9003, 17.5%), and Irgacure 184 (BASF, 2%). Achiwell 4221 (Brenntag Specialties, Inc., 40.7%), OXT-101 (TOAGOSEI AMERICA INC., 16.2%), Chivacure 1176 (Chitec, 5%), 10% particles, 1% 461 DET 40 d25 and 10% TiO2 (DuPont R104) along with a dispersant (BYK 340, 1.5%) by weight were then added. The slurry can be coated on a rigid piece of pre-painted aluminum sheet and cured with combined Fusion D and H lamps at 100 ft/minute to give a dry thickness of 150 microns. The reflectance of this aluminum coated sheet is expected to be between 97% and 98%.

Example 10

High Reflectance Powders Embossed on UV Curable Epoxy/Acrylate Hybrid Binder

Plexifilamentary film-fibril sheet material sold as DuPont™ Tyvek® 1070D grade was ground into fine particles and combined with a thermally curable epoxy/acrylate hybrid binder system consisting of trimethylolpropane triacrylate (Sartomer SR351LV, 18.6%), propoxylated neopentyl glycol diacrylate (Sartomer SR-9003, 17.5%), and Irgacure 184 (BASF, 2%). Achiwell 4221 (Brenntag Specialties, Inc., 40.7%), OXT-101 (TOAGOSEI AMERICA INC., 16.2%), Chivacure 1176 (Chitec, 5%), 10% particles, 1% 461 DET 40 d25 and 10% $TiO_2$ (DuPont R104) along with a dispersant (BYK 340, 1.5%) by weight were then added. The slurry can be coated on a rigid piece of pre-painted aluminum sheet and partially cured with reduced UV exposure, then sprayed with high reflectance powder Dynoadd 506 on the coating surface, embossed with embossing roll, followed by UV cure with combined Fusion D and H lamps at 100 ft/minute to give a dry thickness of 150 microns. The reflectance of this aluminum coated sheet is expected to be between 97% and 98%.

Example 11

Prophetic

A white 98% reflective, microcellular foamed polyester sheet (sold as MC-PET® by The Furukawa Electric Co., Ltd., Tokyo, Japan) can be ground into particles having an average diameter of approximately 0.1 mm using a rotary conical mill. The particles can be combined with the binder system of Example 5 to create a paint-particle slurry containing about 20% particles and about 80% binder by weight. The slurry can be coated on a rigid piece of aluminum sheet and cured at 80° C. to give a dry thickness of 350 microns. The reflectance of this aluminum coated sheet is expected to be between 97% and 98%.

Example 12

Combined Hollow and Solid Microspheres

A base solution of polyurethane dispersion (Witcobond® W-290H), 10% wt TiO$_2$ (R104 DuPont) and 2% dispersant (Dynoadd 502) was created. Solid polymer microspheres (Dynoadd 506) were mixed 10% by weight into the solution. Coatings were made onto a pre-painted aluminum sheet using a Mayer rod resulting in 75 micron thickness. Reflectance of the pre-painted aluminum sheet measured 65%. The resultant coating measured 86% reflectance and did not show a significant difference in reflection vs. a coating made from the base solution containing no microspheres. Solid polymer microspheres (Dynoadd 506) were then mixed as a dry powder with hollow microspheres (Expancel D70) in a 50/50 volumetric ratio. This microsphere mix was mixed 10% by weight into the base solution. Reflectance of the coating made with the microsphere mix was measured to be 91% and 5% greater than the coating made from the base solution containing no microspheres. This result is surprising and unexpected, since the microspheres are known to lose reflectance when combined with a binder solution.

Table 1 below reports the reflectance measurements of Examples 1-5 above, and the reflectance measurements of several known reflectors. Reflectance measurements were obtained using an Avantes Spectrocam spectrophotometer (available from Avantes Inc., Broomfield, Colo.) with 0°/45° measuring geometry per ANSI/ISO 5.4 and 1.5×2 mm diameter measuring aperture calibrated to a factory-matched white standard. The output is percent reflectance at each wavelength and the spectral range measured is 380 nm to 750 nm in 5 nm intervals. For each sample, 10 readings were taken randomly across a 10 cm area and averaged to account for variation in the coating.

TABLE 1

| Sample | Carrier | Macroporous Material | Particle Size (microns) | Thickness (microns) | % Reflectance @ 550 nm |
|---|---|---|---|---|---|
| TiO$_2$ (Behr ®) Paint | NA | NA | NA | 250 | 94.2 |
| Powder Coat | NA | NA | NA | 100 | 91.4 |
| Tyvek ® 4173 | NA | NA | NA | 180 | 91.4 |
| Tyvek ® 1070D | NA | NA | NA | 190 | 94.3 |
| Toray ® E60SL | NA | NA | NA | 185 | 96.5 |
| Example 1 | Water based acrylic paint | DuPont Tyvek ® Brillion grade | 200 | 90 | 95.2 |
| Example 2 | Water based acrylic paint | DuPont Tyvek ® Brillion w/ TiO$_2$ | 100 | 200 | 98.3 |
| Example 3 | Water-based acrylic adhesive | DuPont Tyvek ® 1070D w/TiO$_2$ | 200 | 250 | 97.5 |
| Example 4 | Water based acrylic paint | Toray ® E60SL | 100 | 180 | 96.0 |
| Example 5 | Solvent-based acrylic | DuPont Tyvek ® 1070D w/TiO$_2$ | 100 | 150 | 97.1 |

While the foregoing invention has been described in some detail for purposes of clarity and understanding, it will be appreciated by one skilled in the art from a reading of this disclosure that various changes in form and detail can be made without departing from the true scope of the invention and appended claims. All patents and publications cited herein are entirely incorporated herein by reference.

What is claimed is:

1. A diffusively light reflective paint composition comprising a paint carrier, hollow and solid microspheres in a volumetric ratio between about 1:4 to about 3:4 hollow to solid microspheres, and between about 1% by weight and about 90% by weight macroporous polymeric particles having an average diameter between about 1 micron and about 300 microns.

2. The paint composition of claim 1, wherein the microspheres are plastic or ceramic.

3. The paint composition of claim 1 having a light reflectance of between about 95% to about 98% measured at 550 nm when said composition is dried on a rigid surface.

4. The paint composition of claim 1 comprising between about 5% and about 80% by weight macroporous polymeric particles.

5. The paint composition of claim 1 comprising between about 5% and about 20% by weight macroporous polymeric particles.

6. The paint composition of claim 1, wherein the macroporous polymeric particles have an average diameter between about 3 microns and about 200 microns.

7. The paint composition of claim 6, wherein the macroporous polymeric particles have an average diameter between about 100 microns and about 200 microns.

8. The paint composition of claim 1 further comprising a pigment.

9. The paint composition of claim 1 further comprising an additive selected from the group consisting of wetting agents, dispersants, antistatic agents, UV inhibitors, optical brighteners, wax lubricants, antioxidants, antimicrobial agents and mixtures thereof.

10. The paint composition of claim 1 wherein the paint carrier further comprises a binder selected from the group consisting of acrylic binders, polyurethane binders, polyester binders and epoxy-based binders, and mixtures thereof.

11. The paint composition of claim 1, wherein the paint carrier further comprises an epoxy/acrylate hybrid binder.

12. A diffusively light reflective article comprising a substrate having at least one light reflective surface having a layer thereon of diffusively light reflective paint composition comprising a paint carrier, hollow and solid microspheres in a volumetric ratio between about 1:4 to about 3:4 hollow to solid microspheres, and between about 1% by weight and about 90% by weight, based on the paint composition, of macroporous polymeric particles having an average diameter between about 1 micron and about 300 microns.

13. The article of claim 12 wherein the layer of paint has a thickness between about 0.025 mm and about 1 mm.

14. The article of claim 12 wherein the article is a luminaire and the substrate comprises a rigid housing.

15. The article of claim 12 wherein the at least one light reflective surface has a light reflectance of at least about 97% measured at 550 nm.

16. The article of claim 12, wherein the diffusively light reflective paint further comprises an epoxy/acrylate hybrid binder.

17. The article of claim 12, wherein the microspheres are present from about 0.5% to about 10% by weight based on the paint composition.

18. A process for making a diffusively light reflective paint composition comprising:
   a) providing a binder composition comprised of a solvent, hollow and solid microspheres in a volumetric ratio between about 1:4 to about 3:4 hollow to solid microspheres, and a binder selected from the group consisting of acrylic binders, polyurethane binders, polyester binders and epoxy-based binders, and mixtures thereof;
   b) contacting said binder with between about 1% by weight and about 90% by weight, based on the paint composition, of macroporous polymeric particles having an average diameter between about 1 micron and about 300 microns; and
   c) blending said binder composition and said macroporous polymeric particles to form a slurry.

19. A method for forming a diffusively light reflective article comprising:
   a) providing a substrate comprising at least one surface, and
   b) applying the paint composition of one of claims 1 and 2-11 to at least one surface of the substrate; and
   c) optionally, embossing a dry powder of plastic or ceramic microspheres, or both, on the substrate and curing the substrate.

20. The method of claim 19 wherein the embossing step is achieved by partially curing with thermal or UV curing or combined thermal/UV curing, followed by spraying high reflectance dry powder and embossing via embossing roll.

21. The method of claim 20, further comprising fully curing the substrate by means of thermal or UV curing or combined thermal/UV curing.

22. The method of claim 19, wherein the dry powder further comprises a component selected from the group consisting of crosslinked polymeric particles and $TiO_2$.

23. A diffusively light reflective paint composition comprising a paint carrier, hollow and solid microspheres in a volumetric ratio between about 1:4 to about 3:4 hollow to solid microspheres, and between about 1% by weight and about 90% by weight, based on the paint composition, of macroporous polymeric particles having an average diameter between about 1 micron and about 300 microns and having micropores, microvoids, or fibril fractures between 0.3 and 0.7 microns in diameter.

24. The paint composition of claim 2 having a light reflectance of between about 95% to about 98% measured at 550 nm when said composition is dried on a rigid surface.

* * * * *